United States Patent
Wu et al.

(10) Patent No.: US 9,115,826 B2
(45) Date of Patent: Aug. 25, 2015

(54) CABLE FASTENER WITH CABLE MANAGEMENT FUNCTION

(71) Applicant: Tsun-Zong Wu, New Taipei (TW)

(72) Inventors: Tsun-Zong Wu, New Taipei (TW); Hsien-Jung Chen, New Taipei (TW)

(73) Assignee: Tsun-Zong Wu, New Taipei (TW)

( * ) Notice: Subject to any disclaimer, the term of this patent is extended or adjusted under 35 U.S.C. 154(b) by 98 days.

(21) Appl. No.: 14/056,364

(22) Filed: Oct. 17, 2013

(65) Prior Publication Data

US 2015/0107058 A1   Apr. 23, 2015

(51) Int. Cl.
*F16L 3/015* (2006.01)
*B65H 75/36* (2006.01)
*H02G 11/00* (2006.01)
*H01R 13/72* (2006.01)

(52) U.S. Cl.
CPC ............... *F16L 3/015* (2013.01); *B65H 75/36* (2013.01); *H01R 13/72* (2013.01); *H02G 11/00* (2013.01); *B65H 2701/34* (2013.01); *Y10T 24/39* (2015.01); *Y10T 24/3916* (2015.01); *Y10T 24/3918* (2015.01); *Y10T 24/3929* (2015.01); *Y10T 24/4088* (2015.01); *Y10T 24/4093* (2015.01); *Y10T 24/44983* (2015.01)

(58) Field of Classification Search
CPC ......... F16L 3/015; B65H 57/00; Y10T 24/39; Y10T 24/3916; Y10T 24/3918; Y10T 24/3929; Y10T 24/4088; Y10T 24/4093; Y10T 24/44983

USPC .......................................................... 439/501
See application file for complete search history.

(56) References Cited

U.S. PATENT DOCUMENTS

| 2,012,466 | A | * | 8/1935 | Goldsmith et al. | 24/198 |
| 2,133,153 | A | * | 10/1938 | Shaulson | 24/198 |
| RE22,040 | E | * | 2/1942 | White | 24/196 |
| 3,077,650 | A | * | 2/1963 | Horne | 24/200 |
| 4,178,661 | A | * | 12/1979 | Klein | 24/130 |
| 4,248,401 | A | * | 2/1981 | Mittleman | 251/7 |
| 4,281,439 | A | * | 8/1981 | Klein | 24/130 |
| 6,056,625 | A | * | 5/2000 | Fildan | 450/86 |
| 7,601,048 | B2 | * | 10/2009 | Groner | 450/86 |
| 7,753,758 | B1 | * | 7/2010 | Arrington | 450/89 |
| 2009/0126163 | A1 | * | 5/2009 | Groner | 24/302 |
| 2009/0193628 | A1 | * | 8/2009 | Gebrewold et al. | 24/200 |
| 2014/0015301 | A1 | * | 1/2014 | Perlman et al. | 297/468 |

* cited by examiner

*Primary Examiner* — Victor Batson
*Assistant Examiner* — Louis Mercado
(74) *Attorney, Agent, or Firm* — Muncy, Geissler, Olds & Lowe, P.C.

(57) ABSTRACT

A cable fastener with cable management function is revealed. The cable fastener is a hollow frame formed by two first side walls disposed at an interval along the length direction and two second side walls. The frame has an opening perpendicular to a length direction and two convex bodies arranged symmetrically on inner surfaces of the second side walls. A plurality part of a cable with equal length is respectively mounted into the opening of each cable fastener, passed through the convex bodies and secured in the frame. A plurality of bend points is formed on the cable along the length direction so that the cable is bent into bundles. The cable management and positioning is achieved.

10 Claims, 10 Drawing Sheets

CABLE FASTENER WITH CABLE MANAGEMENT FUNCTION

BACKGROUND OF THE INVENTION

1. Fields of the Invention

The present invention relates to a fastener, especially to a cable fastener with cable management function.

2. Descriptions of Related Art

There are various types of cables used in our daily lives such as phone lines, power lines, appliance cords, network cables, etc. The cables generally have flexibility. While the cable is not in use or too long, a part of the cable is folded for storage otherwise the cables are twisted, tangled or stretched to occupy the additional area. Moreover, the folded cables may look like a mess or get tangled.

Figure 1:
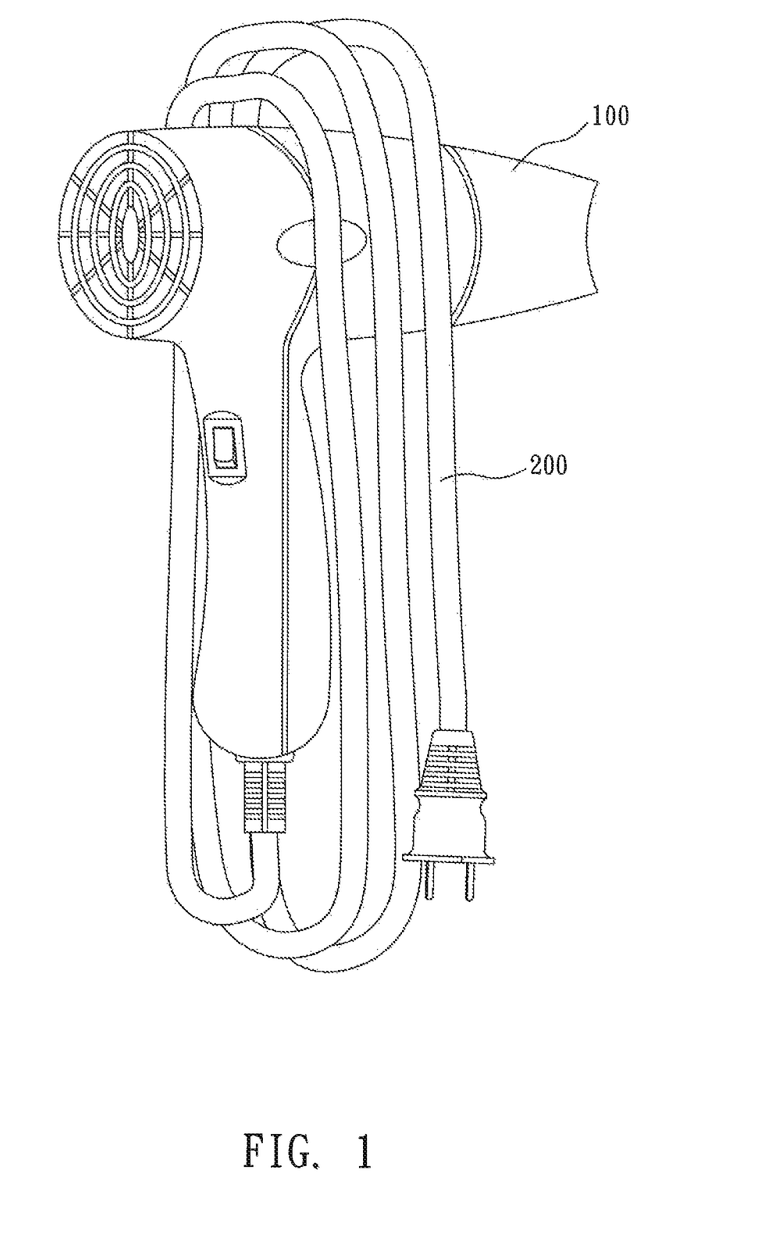
FIG. 1 to FIG. 3 are schematic drawings showing three different folded states of the cable of conventional appliances.
Figure 2:
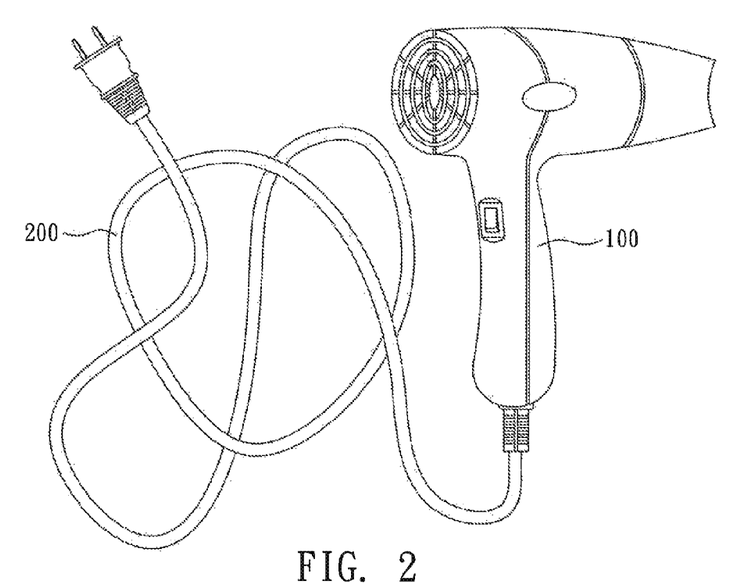
Figure 3:
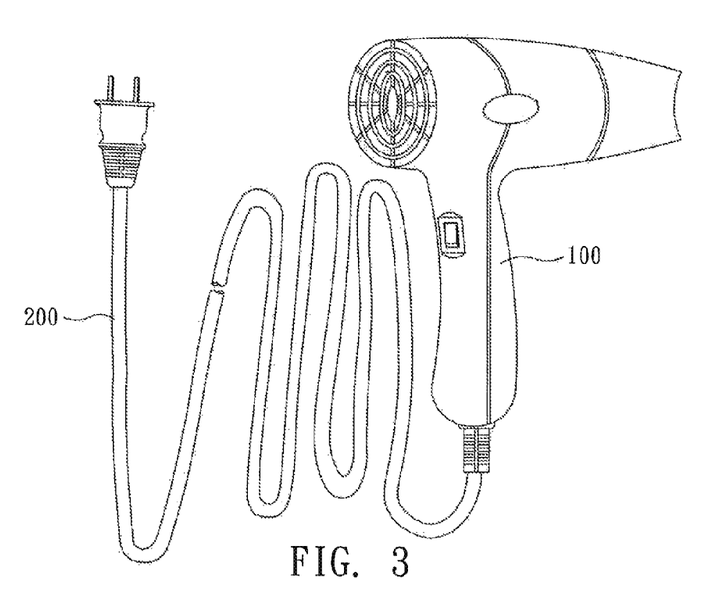
Figure 4:
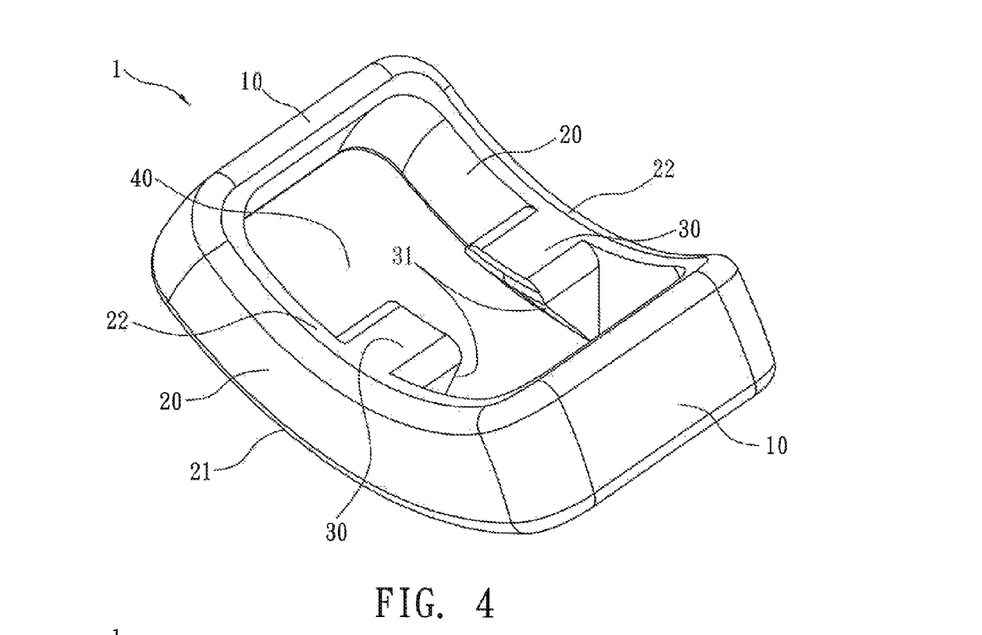
FIG. 4 is a perspective view of an embodiment of a cable fastener according to the present invention.
Figure 5:
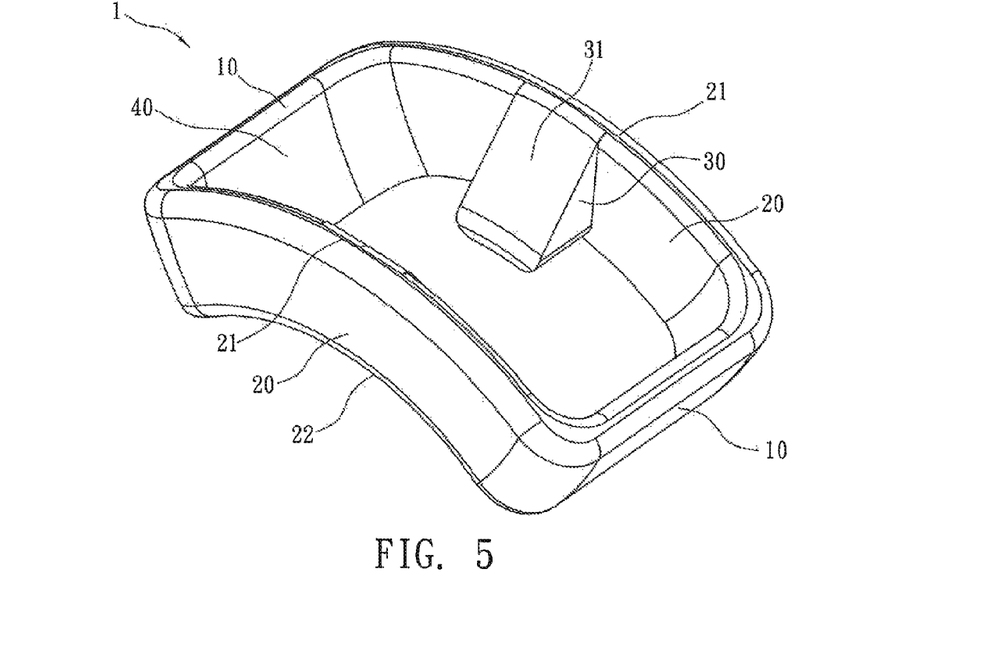
FIG. 5 is a bottom view of the embodiment in FIG. 4 according to the present invention.

Take a hair dryer as an example. As shown in FIG. 1, a cable 20 of a hair dryer 100 is usually wrapped around the hair dryer 100. Refer to FIG. 2, the cable 200 is wound freely. Or as shown in FIG. 3, the cable 200 can also be folded over in a back and forth pattern several times.

However, the shortcoming of the folded cable in FIG. 1 and FIG. 2 is in that the cable occupies too much space and the cable is easy to get tangled. This affects the aesthetics of the hair dryer 100. The disadvantage of the folded cable in FIG. 3 is in that the length of the cable 200 between two adjacent bend points is not equal after the cable being folded. Thus the cable 200 looks messy and irregular.

SUMMARY OF THE INVENTION

Therefore it is a primary object of the present invention to provide a cable fastener for managing and storing cables easily and conveniently.

In order to achieve the above object, a cable fastener of the present invention is secured on a cable to form a bend point. When a plurality of cable fasteners is secured at certain intervals on the cable along the length direction of the cable, the cable is folded back and forth at each bend point so as to form neat bundles. The cable fastener is a hollow frame having two first side walls, two second side walls and two convex bodies. The two first side walls are arranged at a certain interval along the length direction of the cable and are symmetrical to each other and so are the second side walls but along the width direction of the cable. The second side walls respectively connected to the two first side walls to form the frame with an opening perpendicular to the length direction. The two convex bodies are disposed symmetrically on opposite surfaces of the two second side walls, located on the inner sides of the opening and used for stopping and securing. Each convex body is set with a ramp part slanting down toward the opening. A part of the cable is mounted into the opening of the frame, moved along the ramp part of each convex body and passed through the two convex bodies so as to keep the cable between the two convex bodies and the two first side walls. Thus the cable fastener and the cable are secured with each other and positioned.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Refer from FIG. 4 to FIG. 8, a cable fastener 1 of the present invention includes two first side walls 10, two second side walls 20, and two convex bodies 30.

The two first side walls 10 are arranged at a certain interval along the length direction and are symmetrical to each other. The length direction represents the length direction of the cable 2.

The two second side walls 20 are arranged at a certain interval along the width direction, symmetrical to each other, and respectively connected to each first side wall 10 to form a hollow frame with an opening 40 that is perpendicular to the length direction.

The two convex bodies 30 are arranged symmetrically on opposite surfaces of the two second side walls 20, located on the inner sides of the opening 40 and used for stopping and securing. Each convex body 30 is disposed with a ramp part 31 slanting down toward the opening 40 so that the distance between one end of the two convex bodies 30 is large than the distance between the other end of the two convex bodies 30. The end with larger distance is close to the opening 40 while the other end with smaller distance is away from the opening 40.

While in use, the cable fastener 1 is fastened and positioned on a cable 2 so as to form a bend point 3 along the length direction of the cable 2. When a plurality of cable fasteners 1 is arranged at intervals and fastened on the cable 2 and a user folds the cable 2 back and forth at the position with each cable fastener 1 along the length direction of the cable 2, neat bundles of the cable 2 are formed. Each part of the cable 2 of the bundles has the same length.

Figure 11A:
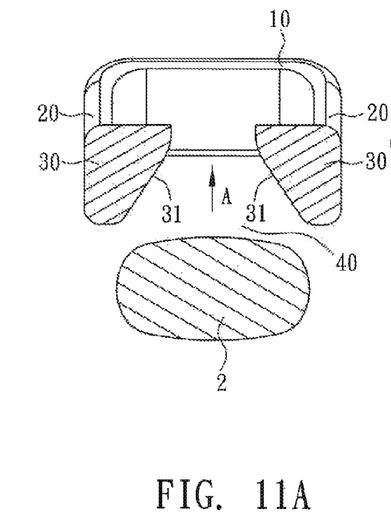
FIG. 11A and FIG. 11B are schematic drawings showing how an embodiment of a cable fastener is fastened with a flat cable according to the present invention.
Figure 11B:
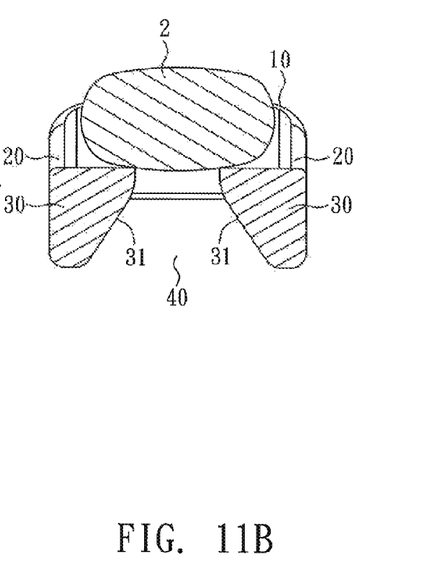
Figure 12A:
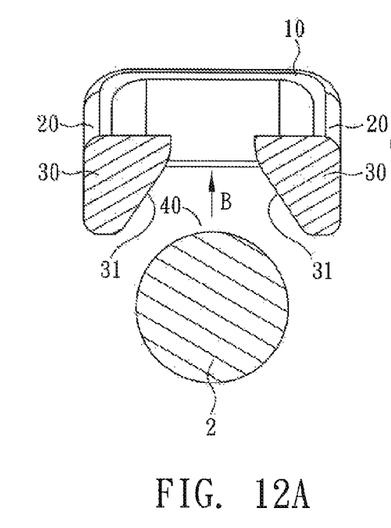
FIG. 12A and FIG. 12B are schematic drawings showing how an embodiment of a cable fastener is fastened with a round cable according to the present invention.
Figure 12B:
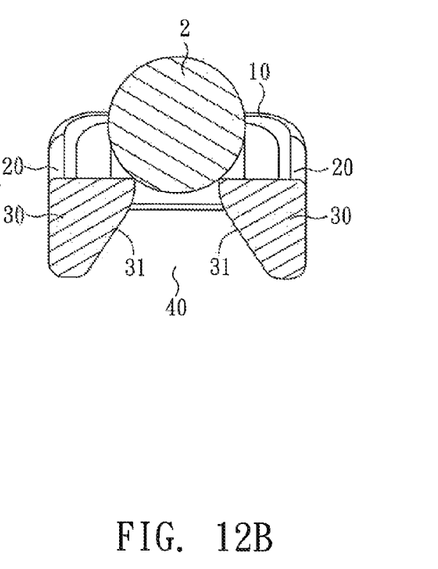

As shown in FIG. 9, FIG. 10, FIG. 11A, FIG. 11B, FIG. 12A, and FIG. 12B, a predetermined position of the cable 2 (such as flat type or round type) is mounted into the cable fastener 1 through the opening 40, moved along the ramp part 31 of the two convex bodies 30 (as the arrow A in FIG. 11A and the arrow A in FIG. 12A indicated) and passed through the two convex bodies 30 so as to keep the cable 2 between the two convex bodies 30 and the two first side walls 10 (as shown in FIG. 11B and FIG. 12B). Thus the fastening of the cable fastener 1 with the cable 2 has been completed and a bend point 3 is formed at the predetermined position of the cable 2.

Figures 13, 14:
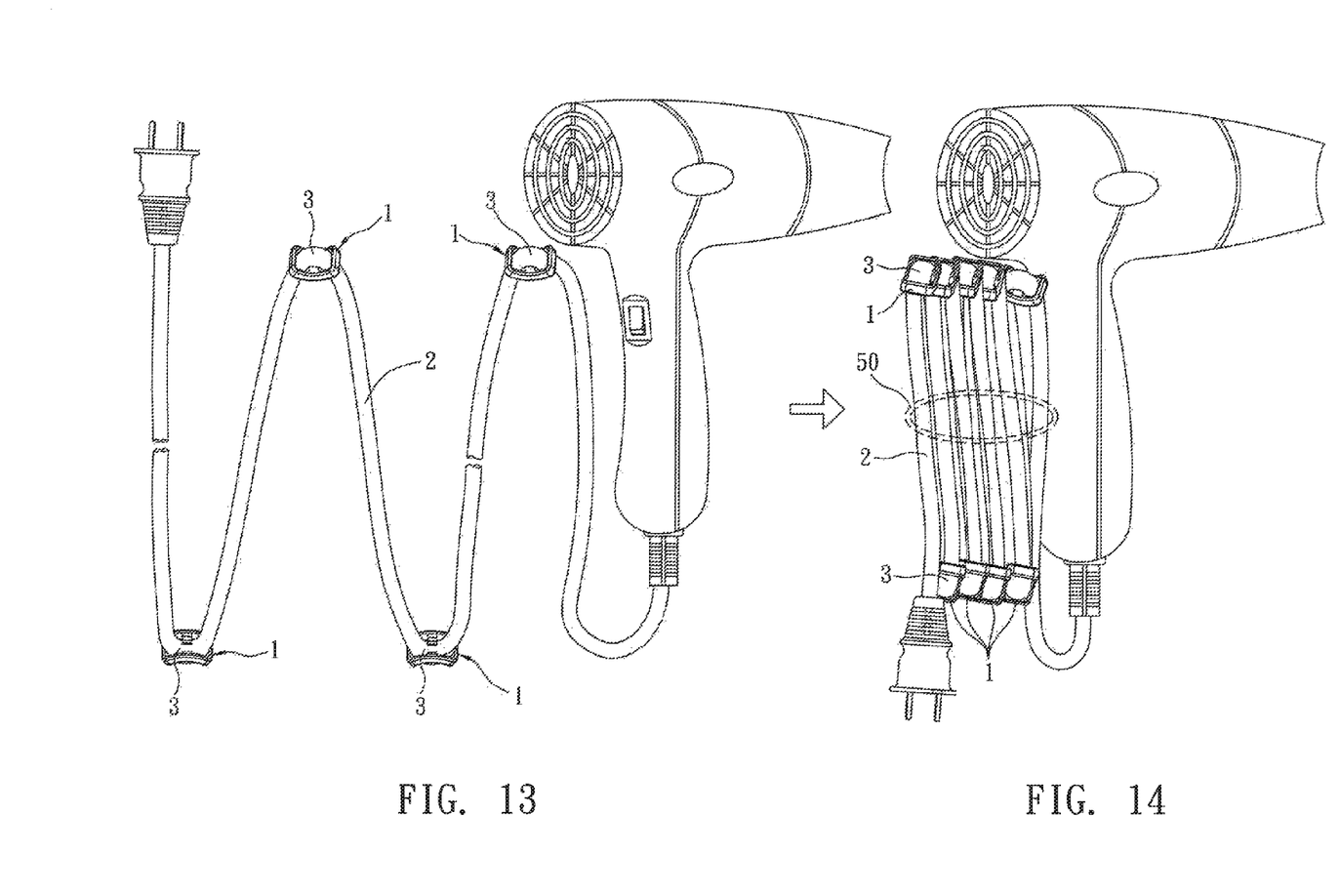
FIG. 13 is a schematic drawing showing a plurality of cable fasteners fastened with a cable according to the present invention.
FIG. 14 is a schematic drawing showing the cable in FIG. 13 being folded according to the present invention.

As shown in FIG. 13 and FIG. 14, a plurality of cable fasteners 1 are arranged at intervals on the cable 2 along the length direction of the cable 2. At the same, time, a plurality of bend points 3 arranged at intervals is formed. By the bend points 3, the cable 2 becomes tidy bundles. In order to reduce the space the cable 2 occupies during the folding and storage process, the two adjacent cable fasteners 1 on the cable 2 are facing in opposite directions. Thus the cable 2 is folded more easily and conveniently. The folded cable 2 is wrapped by a fastener 50 such as Velcro or elastic band to keep it from unravelling, as shown in FIG. 14.

Figure 6:
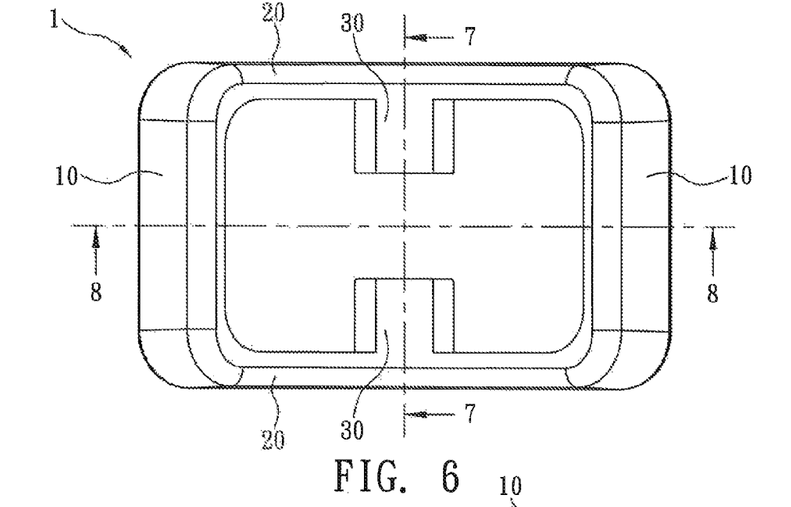
FIG. 6 is a top view of the embodiment in FIG. 4 according to the present invention.
Figure 15:
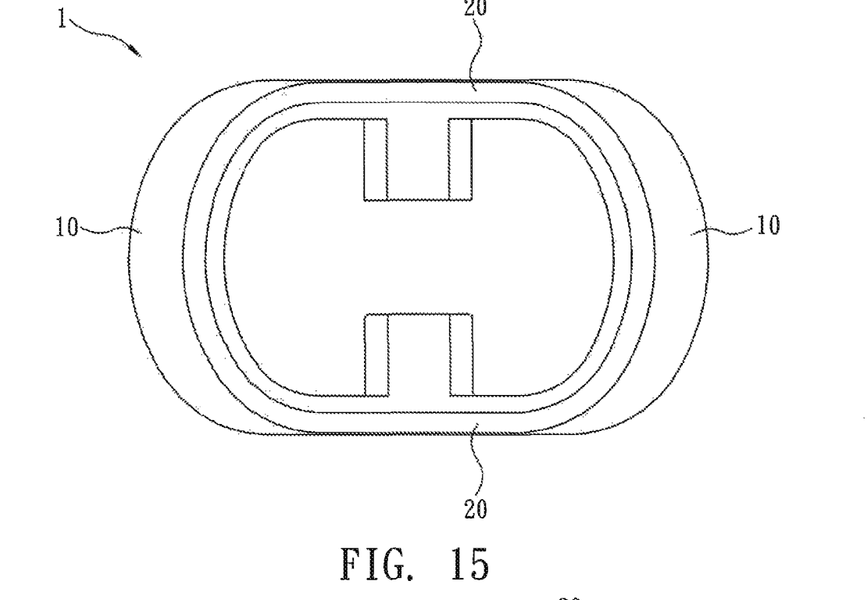
FIG. 15 is a top view of another embodiment of a cable fastener according to the present invention.

Refer to FIG. 6, the shape of the frame of the cable fastener 1 is rectangular, but not limited to. The shape can also be an oblong oval, as shown in FIG. 15.

As shown in FIG. 4, FIG. 8, FIG. 16, and FIG. 17, the shape of the second side wall 20 of the cable fastener 1 can be designed to various types according to user's requirements. For example, one side of the second side wall 20 close to the opening 40 can be a horizontal line or a convex curve 21. The other side of the second side wall 20 away from the opening 40 can also be a horizontal line or a concave curve 22 corresponding to the convex curve 21.

Figure 16:
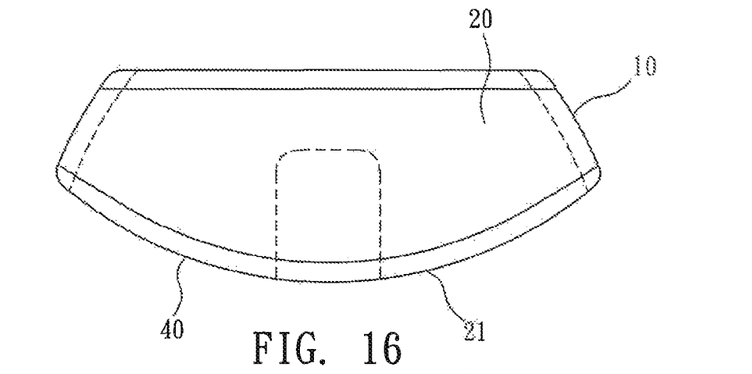
FIG. 16 is a side view of a further embodiment of a cable fastener according to the present invention.
Figure 17:
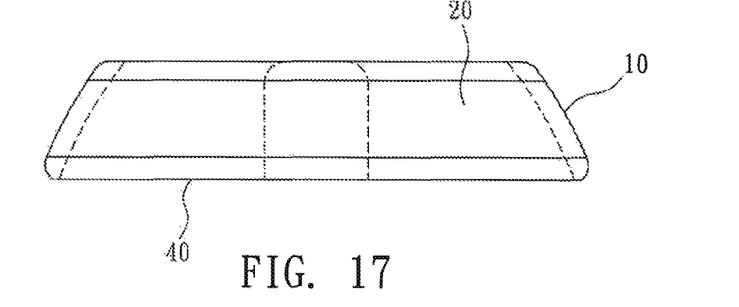
FIG. 17 is a side view of a further embodiment of a cable fastener along according to the present invention.

In a preferred embodiment of the present invention, one side of the second side wall 20 of the cable fastener 1 is a convex curve 21 perpendicular to the length direction and adjacent to the opening 40. The other side of the second side wall 20 is a concave curve 22 corresponding to the convex curve 21. Thus each second side wall 20 forms a curved structure. That means the two ends of each second side wall 20 are curved in relative to a middle part of the second side wall 20.

Figure 7:
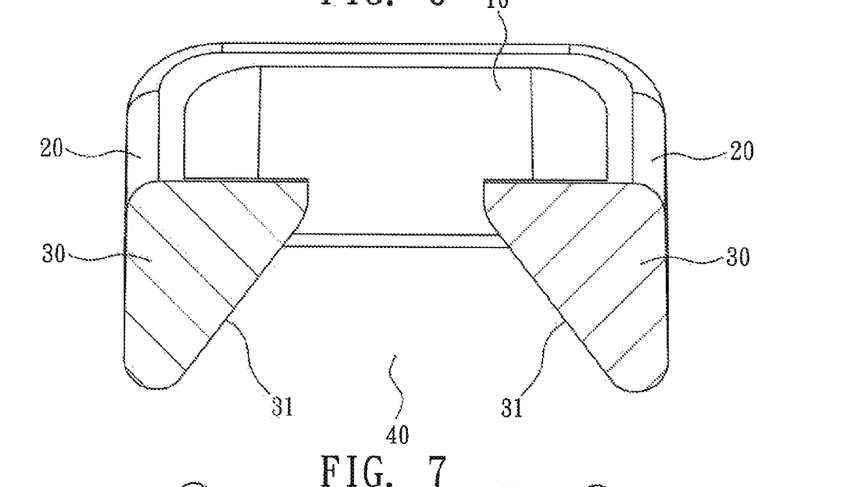
FIG. 7 is a cross sectional view along line 7-7 of the embodiment in FIG. 6 according to the present invention.
Figure 18:
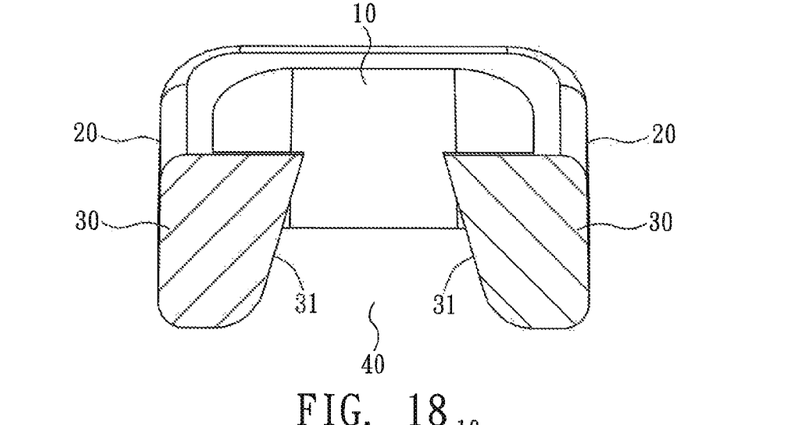
FIG. 18 is a cross sectional view of a further embodiment of a cable fastener along a width direction according to the present invention.
Figure 19:
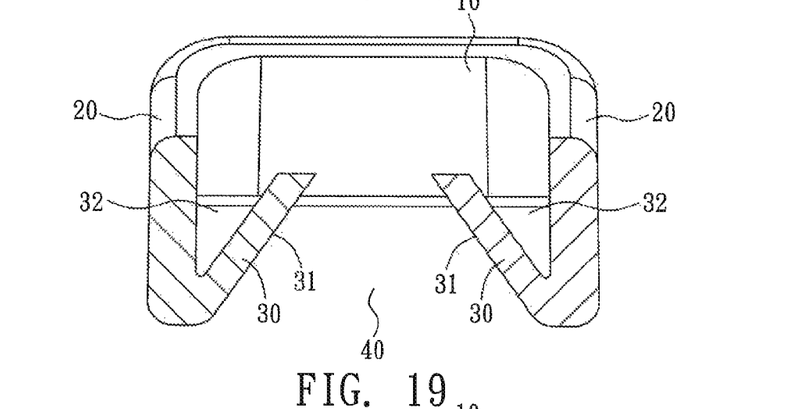
FIG. 19 is a cross sectional view of a further embodiment of a cable fastener along a width direction according to the present invention.
Figure 20:
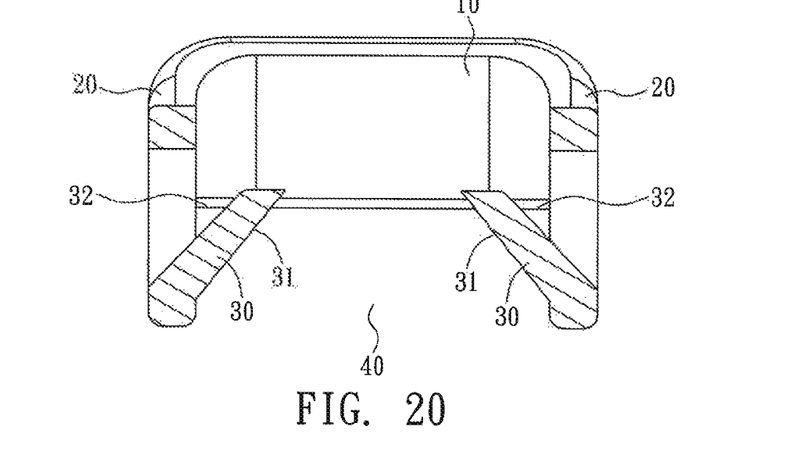
FIG. 20 is a cross sectional view of a further embodiment of a cable fastener along a width direction according to the present invention.

Refer to FIG. 7, FIG. 18, FIG. 19 and FIG. 20, view the cable fastener 1 of the present invention from the width direction thereof, the cross section of each convex body 30 can be triangular (as shown in FIG. 7), trapezoid (as shown in FIG. 18), J-shaped (as shown in FIG. 19), or I-shaped (as shown in FIG. 20). As shown in FIG. 20, the convex body 30 of the cable fastener 1 can be produced by punching process, being punched from the outer side of the second side wall 20 of the cable fastener 1 toward the inner side thereof. Thus a part of wall surface of the second side wall 20 is separated from the original wall surface and is projecting inward to form the convex body 30. The cross section of the convex body 30 is I-shaped. Moreover, the cross section of the convex body 30 of the cable fastener 1 is J-shaped and I-shaped in FIG. 19 and FIG. 20 respectively. Thus a space 32 is formed between the convex body 30 and the wall surface of the second side wall 20 and the convex body 30 can be elastically deformed due to the space 32. While the cable 2 is against the convex body 30 and moving during the assembly, the elastic deformation of the convex body 30 allows users to secure the cable fastener 1 on the cable 2 more easily and labor-saving.

Figure 8:
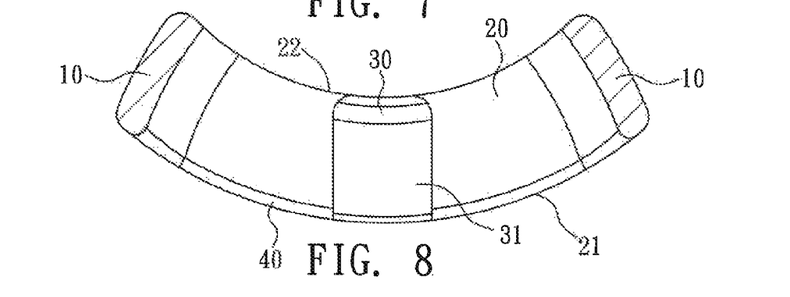
FIG. 8 is a cross sectional view along line 8-8 of the embodiment in FIG. 6 according to the present invention.
Figure 9:
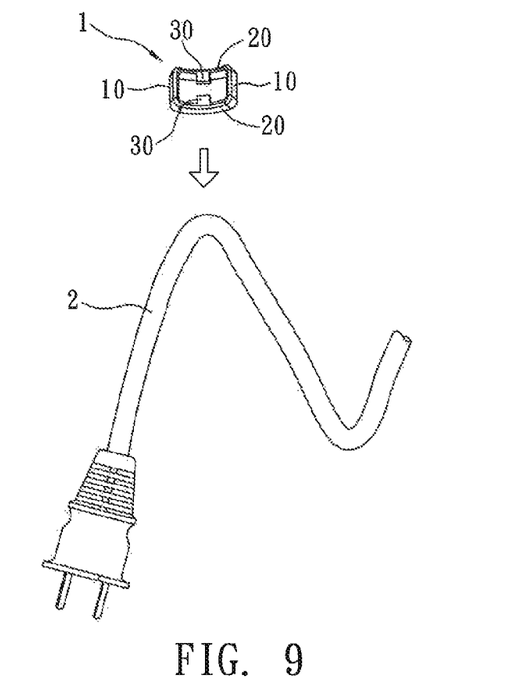
FIG. 9 is a schematic drawing showing a cable fastener and a cable fastener separated from each other according to the present invention.
Figure 10:
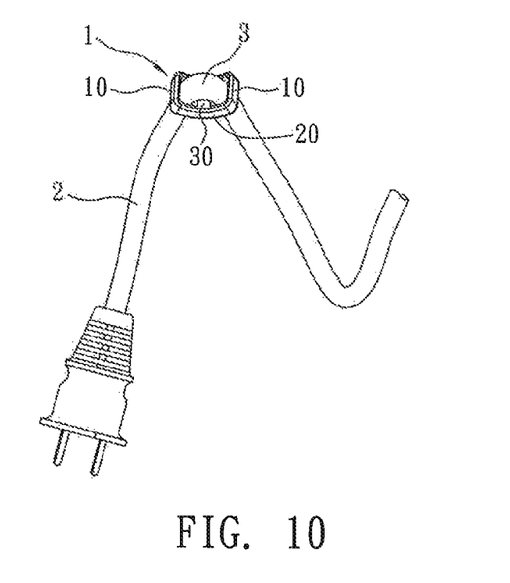
FIG. 10 is a schematic drawing showing a cable fit with a cable fastener according to the present invention.
Figure 21:
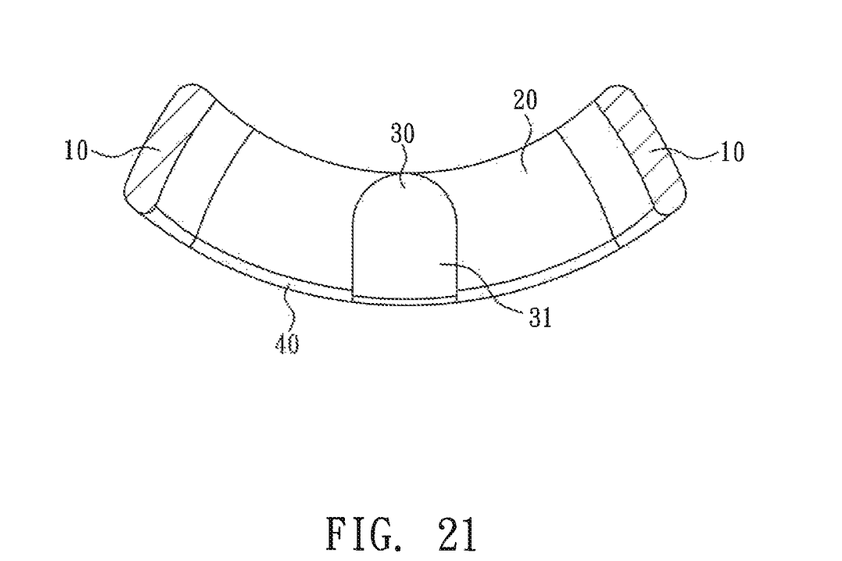
FIG. 21 is a cross sectional view of a further embodiment of a cable fastener along a length direction according to the present invention.
Figure 22:
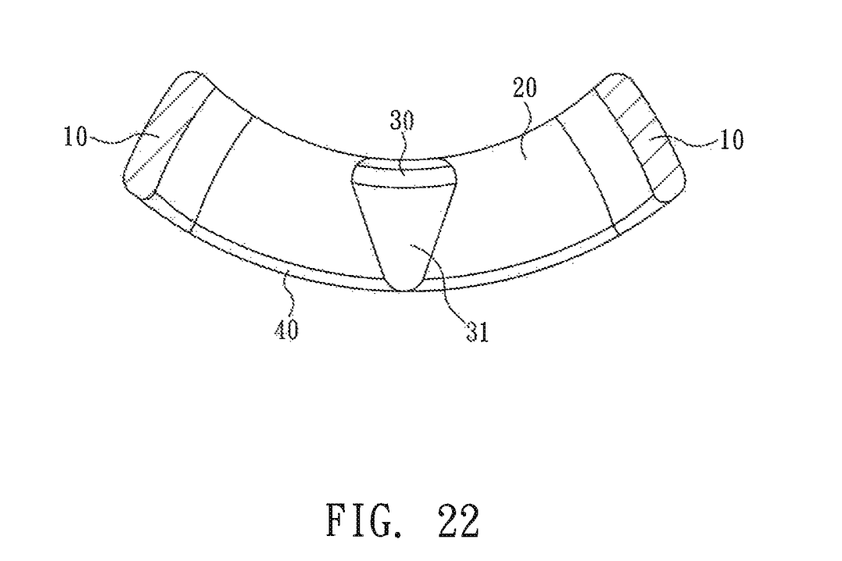
FIG. 22 is a cross sectional view of a further embodiment of a cable fastener along a length direction according to the present invention.

Refer to FIG. 8, FIG. 21, and FIG. 22, view the cable fastener 1 of the present invention from the length direction thereof, the shape of the ramp part 31 of the convex body 30 can be rectangular, U-shaped or triangular.

Instead of a large bending angle, the cable 2 only bends a little bit while passing through the cable fastener 1 and moving between the convex bodies 30 and the first side walls 10 due to the curved structure of the second side wall 20 of the cable fastener 1 when the cable 2 is secured with the cable fastener 1. Thus the bending of the cable 2 will not have negative effect on the cable 2 when the cable 2 is unfolded in use.

The cable fastener 1 is produced integratedly into one part and made from plastic material such as polypropylene (PP), but not limited to. Thus the cable fastener 1 has certain flexibility. This has benefits in operation and the cable 1 is not easily damaged.

In use, the user can fasten the cable fasteners 1 easily on the cable 2 without any other tools and the cable fasteners 1 have no effect on normal use of the cable 2. Moreover, while the user folding the cable 2 for storage, the cable 2 is folded and held together by the cable fasteners 1 to form bundles quickly. This is time-saving. In the bundles of the cable 2, each part of the cable 2 has the same length.

Compared with conventional cable fasteners, the cable fastener of the present invention reduces the space the folded cable occupies and improves space utilization. At the same time, the shortcoming of the conventional cable being folded such as easily getting twisted or tangled is overcome. The cable fastener 1 keeps the folded cable 2 together in neat bundles. The bundles of the cable 2 are tidy and having the same length. Therefore the space is saved, the storage is convenient and the aesthetics of the cable is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents. Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cable fastener that is a hollow frame, having cable management function and secured on a cable to form a bend point comprising:

two first side walls arranged at a certain interval along a length direction and symmetrical to each other;

two second side walls disposed at a certain interval along a width direction, symmetrical to each other, and respectively connected to each first side wall to form the hollow frame with an opening that is perpendicular to the length direction;

two convex bodies arranged symmetrically on opposite surfaces of the two second side walls and each of which having a ramp part slanting down toward the opening;

wherein a plurality of cable fasteners is fastened on the cable so that the cable is bent at the bend point along the length direction of the cable so as to form neat bundles; and wherein the cable is mounted into each cable fastener through the opening, moved along the ramp part of each convex body and passed through the two convex bodies so as to keep the cable between the two convex bodies and the two first side walls;

the cable fastener and the cable are secured with and positioned by each other.

2. The device as claimed in claim 1, wherein a cross section of the convex body is triangular, trapezoid, J-shaped, or I-shaped.

3. The device as claimed in claim 1, wherein a shape of the frame of the cable fastener is rectangular or oblong oval.

4. The device as claimed in claim 1, wherein a convex curve perpendicular to the length direction is extended from one side of each second side wall of the cable fastener that is close to the opening.

5. The device as claimed in claim 4, wherein one side of the second side wall of the cable fastener opposite to the side of the second side wall arranged with the convex curve is disposed with a concave curve corresponding to the convex curve.

6. The device as claimed in claim 4, wherein one side of the second side wall of the cable fastener opposite to the side of the second side wall arranged with the convex curve is a horizontal line.

7. The device as claimed in claim 1, wherein one side of each second side wall of the cable fastener close to the opening is a horizontal line while another side away from the opening is a horizontal line.

8. The device as claimed in claim 1, wherein the ramp of the convex body of the cable fastener is rectangular.

9. The device as claimed in claim 1, wherein the ramp of the convex body of the cable fastener is U-shaped.

10. The device as claimed in claim 1, wherein the ramp of the convex body of the cable fastener is triangular.

* * * * *